United States Patent
Eggert (10) Patent No.: US 11,051,124 B2
(45) Date of Patent: Jun. 29, 2021

(54) METHOD FOR CHECKING THE ASSOCIATION OF RADIO NODES WITH A RADIO ENVIRONMENT BY EVALUATING INTERFERENCE SIGNAL COMPONENTS

(71) Applicant: METIRIONIC GMBH, Dresden (DE)

(72) Inventor: Dietmar Eggert, Dresden (DE)

(73) Assignee: Metirionic GmbH, Dresden (DE)

( * ) Notice: Subject to any disclaimer, the term of this patent is extended or adjusted under 35 U.S.C. 154(b) by 0 days.

(21) Appl. No.: 16/907,869

(22) Filed: Jun. 22, 2020

(65) Prior Publication Data
US 2020/0322752 A1 Oct. 8, 2020

Related U.S. Application Data

(63) Continuation of application No. PCT/EP2018/000584, filed on Dec. 21, 2018.
(Continued)

(30) Foreign Application Priority Data

Dec. 21, 2017 (DE) ............... 10 2017 011 879.5

(51) Int. Cl.
*G01S 5/02* (2010.01)
*H04W 4/02* (2018.01)
(Continued)

(52) U.S. Cl.
CPC ............. *H04W 4/02* (2013.01); *G01P 1/00* (2013.01); *G01P 15/08* (2013.01); *G01R 33/07* (2013.01);
(Continued)

(58) Field of Classification Search
CPC ......... H04W 4/02; H04W 4/40; H04W 24/10; G01P 1/00; G01P 15/08; G01R 33/07;
(Continued)

(56) References Cited

U.S. PATENT DOCUMENTS

| 8,442,719 B1 * | 5/2013 | Nowottnick | ....... G07C 9/00309 701/36 |
| 2006/0094350 A1 * | 5/2006 | Ishimura | ................. G01S 13/78 455/9 |

(Continued)

FOREIGN PATENT DOCUMENTS

| DE | 10 2009 021 783 A1 | 9/2010 |
| DE | 10 2015 226 150 A1 | 6/2017 |

OTHER PUBLICATIONS

Cao et al., "Ghost-in-ZigBee: Energy Depletion Attack on ZigBee based Wireless Networks," IEEE Internet Things Journal, vol. 3, No. 5, pp. 816-829 (Oct. 1, 2016).
(Continued)

*Primary Examiner* — Siu M Lee
(74) *Attorney, Agent, or Firm* — Muncy, Geissler, Olds & Lowe, P.C.

(57) ABSTRACT

A method for checking the association of radio nodes with a radio environment having a radio node set by evaluating interference signal components. At least two radio nodes of the radio node set operate as transceivers during a measurement process and at least one radio node operates exclusively as a transmitter or exclusively as a receiver or as a transceiver during the measurement process. The first evaluation step is performed at least once in a first pass for two reference radio nodes and is performed at least once in a second pass for a test radio node and a reference radio node. A positive or negative decision is made on the association with a radio environment on the basis of at least one result of the first pass and at least one result of the second pass.

10 Claims, 5 Drawing Sheets

Related U.S. Application Data (60) Provisional application No. 62/622,689, filed on Jan. 26, 2018.

(51) Int. Cl.
| | |
|---|---|
| *G01S 5/06* | (2006.01) |
| *G01S 5/14* | (2006.01) |
| *G01S 13/74* | (2006.01) |
| *H04B 1/525* | (2015.01) |
| *H04W 24/10* | (2009.01) |
| *G01P 1/00* | (2006.01) |
| *G01P 15/08* | (2006.01) |
| *G01R 33/07* | (2006.01) |
| *G01S 13/50* | (2006.01) |
| *H04B 1/06* | (2006.01) |
| *H04B 1/38* | (2015.01) |
| *H04L 5/00* | (2006.01) |

(52) U.S. Cl.
CPC .......... *G01S 5/0273* (2013.01); *G01S 5/0289* (2013.01); *G01S 5/06* (2013.01); *G01S 5/14* (2013.01); *G01S 13/50* (2013.01); *G01S 13/74* (2013.01); *H04B 1/06* (2013.01); *H04B 1/38* (2013.01); *H04B 1/525* (2013.01); *H04L 5/0048* (2013.01); *H04W 24/10* (2013.01)

(58) Field of Classification Search
CPC ........ G01S 13/50; G01S 13/74; G01S 13/762; G01S 13/765; G01S 5/0252; G01S 5/0273; G01S 5/0289; G01S 5/06; G01S 5/14; H04B 1/06; H04B 1/38; H04B 1/525; H04L 5/0048; G07C 9/00309; G07C 2009/00555

See application file for complete search history.

(56) References Cited

U.S. PATENT DOCUMENTS

| | | | |
|---|---|---|---|
| 2015/0208207 A1 | 7/2015 | Ye et al. | |
| 2018/0178758 A1* | 6/2018 | Yamaguchi | H04M 1/00 |
| 2019/0180542 A1* | 6/2019 | Geier | H04K 3/825 |
| 2019/0389427 A1* | 12/2019 | Brillon | G07C 9/00309 |
| 2020/0005571 A1* | 1/2020 | Han | B60R 25/10 |

OTHER PUBLICATIONS

Olafsdottir et al., "On the Security of Carrier Phase-based Ranging," Proc. of Cryptographic Hardware and Embedded Systems (CHES), pp. 1-21 (Oct. 19, 2016).

Ranganathan et al., "Physical-Layer Attacks on Chirp-based Ranging Systems," ResearchGate, at https://www.researchgate.net/publication/254008732_Physical_attaccks_on_chirp-based_ranging_systems, pp. 1-11 (Apr. 2012).

* cited by examiner

METHOD FOR CHECKING THE ASSOCIATION OF RADIO NODES WITH A RADIO ENVIRONMENT BY EVALUATING INTERFERENCE SIGNAL COMPONENTS

This nonprovisional application is a continuation of International Application No. PCT/EP2018/000584, which was filed on Dec. 21, 2018, and which claims priority to German Patent Application No. 10 2017 011 879.5, which was filed in Germany on Dec. 21, 2017, and to U.S. Provisional Application No. 62/622,689, which was filed on Jan. 26, 2018 and which are all herein incorporated by reference.

BACKGROUND OF THE INVENTION

Field of the Invention

The present invention relates to a method for checking the association of radio nodes with a radio environment having a radio node set of at least three radio nodes spaced apart from each other by evaluating interference signal components.

Description of the Background Art

Known from DE 10 2009 021 783 A1 is a localization system and a method for localizing at least one mobile telecommunications device by short-range radio.

For the purposes of authentication methods in wireless electronic access systems, distance determinations are typically used in order to avert relay attacks on wireless access systems. Distance bounding is typically spoken of. Authentication is otherwise typically based on cryptological methods. Usually, all authorized parties possess knowledge of a key and of authentication algorithms to be used.

It is disadvantageous that manipulation of the distance determination has become possible in the meantime.

The weaknesses of phase-based distance bounding methods with regard to a relay attack are pointed out in "On the Security of Carrier Phase-Based Ranging," by A. R. S. C. Hildur Olafsdottir, Proceedings of Cryptographic Hardware and Embedded Systems (CHES), https://www.researchgate.net/publication/254008732_Physical-layer_attacks_on_chirp-based_ranging_systems, for example.

SUMMARY OF THE INVENTION

It is therefore an object of the present invention to specify a device and method that advances the state of the art.

According to an exemplary embodiment of the invention, a method for checking the association of radio nodes with a radio environment having a radio node set of at least three radio nodes spaced apart from each other by evaluating interference signal components is provided, wherein each radio node of the radio node set has a radio interface and its own clock, and a time offset exists between the clocks of the radio nodes in each case. At least two radio nodes of the radio node set are reference radio nodes, wherein a distance from each reference radio node to the other reference radio nodes is known and the reference radio nodes constitute a reference system with a radio environment. At least one radio node of the radio node set is a test radio node, wherein an association of the at least one test radio node with the radio environment of the reference system is checked.

The method includes a measurement process, a subsequent evaluation process, and a comparison process. During the measurement process, signals having a carrier frequency are transmitted and received by radio nodes of the radio node set, wherein at least two radio nodes of the radio node set operate as transceivers during the measurement process and at least one radio node operates exclusively as a transmitter or exclusively as a receiver or as a transceiver during the measurement process.

The evaluation process includes an evaluation step, wherein an interference signal component is determined in the evaluation step on the basis of a signal transmitted by a first radio node of the radio node set and received by a second radio node of the radio node set, and during the evaluation process the first evaluation step is performed at least once in a first pass for at least one pair of reference radio nodes and is performed at least once in a second pass for a test radio node and a reference radio node.

In a comparison process, a positive or negative decision is made on the association with a radio environment on the basis of at least one result of the first pass and at least one result of the second pass.

The portion of a received signal that is caused by radiated interference energy is referred to as the interference signal component. In this context, all electromagnetic energy that is transformed into electrical signals by the radio node antennas of the radio node set but has its origin outside the set of radio nodes under consideration is classified as radiated interference energy. Thus, the radiated interference energy is generated by one or by several sources not belonging to the radio node set, also referred to as interference sources or interferers.

Radiated interference can arise through other radio systems that radiate electromagnetic energy in the frequency range under consideration. However, it can also have its origin in electrical systems. Noise-like radiated interference can affect a system as well; cosmic radiation is one example of this.

Radiated interference can be characterized and classified in both absolute and relative terms, which is to say with respect to a reference signal. A variety of methods are available here. In the simplest case, an interference signal power or interference signal power density within a frequency band, an absolute standard deviation, or a relative standard deviation with respect to an average value or a reference signal is determined. A correlation analysis in the time domain, a spectral analysis in the frequency domain, or a signal classification can also be used to characterize the interference source. A determination of the position of the interference sources of the radiated interference is possible by means of a system of multiple spatially distributed radio nodes.

The detection of radiated interference, which is to say electromagnetic radiation not caused by the system, opens up possibilities for identifying a relay attack. This interference is not time-invariant and not deterministic. This also has the result that it is not possible to either predict or rely on even the existence of an interference source. Consequently, radiated-interference-based features constitute a good basis for detecting relay attacks. Preferably, the method according to the invention is used as a supplement to other methods, or the interference signal components are used as a supplementary database to other properties of the system for plausibility testing.

The effect of the environment on the received radio signals of the radio nodes of the reference system, which is to say what the reference radio nodes see of their environment, is designated as the radio environment of the reference system. If the test radio node is located in the same environment, it should see a similar radio environment.

On the assumption that radiated interference that arises has the same effect on all radio nodes to a first approximation, differences in the interference signal components received by radio nodes result solely from the location of the relevant radio node, which is to say, for example, the distance to the interference source and, if applicable, the characteristics of the receiving radio node. Thus, a deviation with regard to the signal strength of the received interference signal component suggests a different distance.

In contrast, a deviation with regard to the number or type of the interference sources determined from the interference signal component suggests that the receiving radio nodes are not located in the same radio environment, and therefore not in the same environment, which is to say not in the immediate vicinity of one another. Thus, it is possible to determine whether a test radio node is located outside the environment of the reference system, since such a test radio node is in general exposed to different interference sources than the reference nodes of the reference system.

In the case of a relay attack, the signals of the reference system, for example at an automobile, are received by a relay system, forwarded, and transmitted in the vicinity of the test radio node, for example in an automobile key. In so doing, the relay system forwards not only the signals from the reference system but also the signals from the interference sources in the environment of the reference system. The signals received by the test radio node thus contain not only features of the interference signal sources in the radio environment of the reference system but also features of the interference signal sources in the environment of the test radio node, and under some circumstances also features of interference sources that took effect in the forwarding by the relay system. Similar considerations apply to signals that are transmitted by the test radio node, forwarded by the relay system, and received by the reference system.

In contrast, the signals exchanged only between the reference radio nodes contain only the features of the interference sources that are located in the environment of the reference system.

For this reason, the method makes provision, among other things, to determine interference signal components, and if applicable to identify and to characterize the interference sources from the radio environment expanded at least by the test radio node, on the basis of signals that have either been received by the test radio node or transmitted by the test radio node. Accordingly, interference signal components are determined and, if applicable the interference sources in the radio environment of the reference system are identified and characterized, on the basis of signals that have been exchanged between reference radio nodes.

If a sufficient match is present between the interference signal components that are determined or the interference sources that are identified and characterized of the test radio node and of the reference system, then a necessary condition is met that the test radio node is located in the environment of the reference system. The degree of match is based here on the application requirements or the confidence level to be attained. As a minimum requirement, a comparison can be made as to whether a non-zero number of interference signal components have been determined both with regard to the test radio node as well as within the reference system. Furthermore, the number of interference sources, nature, or location of the interference sources determined in each case can be compared.

The decision about the association of the test radio node with the test environment preferably is made on the basis of multiple comparisons of different interference source characteristics such as number, type, position, etc., wherein all of the comparisons, for example, or at least a fraction above a specific threshold determined by the application, for example at least 70% or at least 50%, must have a positive result for a positive decision.

It is a matter of course that the distances of the reference radio nodes, at least relative to one another, are known, while an absolute or at least relative position of the test radio node is not known. Through their distance relationship, the reference radio nodes make up the basis for a reference coordinate system. The position of the test radio node or of objects in the environment is not initially known in this coordinate system, and can be determined by means of the method.

It is a matter of course that the radio nodes of the radio node set need not differ aside from the fact that at least relative distances to the reference radio nodes are known. In particular, every radio node includes a receiving unit, a transmitting unit, a signal processor, and at least one antenna, for example.

If a radio node includes multiple antennas, then the transmit signal is radiated by one of the antennas or by multiple antennas. For example, the antennas radiate one after the other in succession during a transmission time period. To this end the transmission time period is divided into multiple time slots, for example, wherein one of the antennas transmits during each time slot. It is a matter of course that the reception of the signals can also be organized accordingly. The transmit signals are preferably unmodulated.

In addition to the radio signals, which is to say the signals transmitted or received during the measurement process, an exchange of data signals is possible through this same interface or by means of the same transmitting unit and the same antennas. In this design, the additional data transfer takes place in the same frequency range as the signals of the measurement process or in another frequency range. Alternatively, each radio node has an additional data interface, wherein the additional data interface is also implemented as wired or wireless. The additional data transfer through this same interface or another interface permits the exchange of data, as for example of signal vectors that have been determined, as well as the coarse time synchronization of the radio nodes.

It is a matter of course that the functionality of the radio nodes during the measurement process is independent of the assignment of the radio node to the group of reference radio nodes or to the group of test radio nodes. In principle, it is possible that a test radio node operates as a transceiver in a first pass of the method according to the invention and operates exclusively as a transmitter or exclusively as a receiver in a second pass. The same also applies to the reference radio nodes.

All radio nodes that both transmit and receive during the measurement process are referred to as transceivers. Radio nodes that operate exclusively in a transmitting mode during the measurement process and transmit at least one transmit signal are referred to as transmitters. In contrast, radio nodes that operate exclusively in a receiving mode during the measurement process and receive at least one signal are referred to as receivers.

It is a matter of course that all values or signal vectors communicated with the method according to the invention can be protected through appropriate encryption mechanisms in order to suitably protect the processes being carried out. Thus, for example, every signal vector can have applied to it a time-varying sequence of numbers that is only known a priori to the participating or authorized radio nodes.

An advantage is that a great deal of information on radiated interference sources and radiated interference energy profiles can be determined without additional technical effort and purely on the basis of the analysis of the received signals, by which means a large database for the plausibility test can be created and the reliability of the plausibility test can be increased. On the basis of the radiated interference profiles, both static and dynamic information about the environment of radio nodes can be determined solely through computational effort.

The method according to the invention makes possible a robust and efficient identification of and protection against relay attacks on radio-based access systems. In this context, simple incorporation of the method according to the invention into established standards for wireless communication, e.g., Bluetooth, Bluetooth Smart, and Zigbee, is possible. The method according to the invention is particularly suited for the enhancement of prior art technologies such as authentication through radio data communication with cryptological methods, transit time measurement with narrow channel bandwidth using regular data frames in multiple radio channels, and the incorporation of additional sensors. For example, the method is suitable as an alternative or complement to authentication in access systems, e.g., in the automotive industry, and can also be combined in a simple manner with additional radar systems such as distance warning radar, parking sensors, inertial sensors for orientation, temperature, air pressure, etc., on the automobile side, or with inertial sensors on the key side.

According to a first embodiment, the measurement process includes at least two measurement passes, wherein, in each measurement pass, a transmit signal with a carrier frequency is transmitted during a transmission time period by each transceiver in succession, and the transmit signal that is transmitted is received by at least the other transceivers during a receiving time period, the transmit signals of the transceivers are coherent with one another at least during one measurement pass, the carrier frequency of each measurement pass differs from the carrier frequencies of all other measurement passes or is the same as at least one of the carrier frequencies of the other measurement passes, and if one radio node operates as a transmitter during the measurement process, the at least one transmitter in each case transmits a transmit signal with a carrier frequency during at least one additional transmission time period before or during or after one of the measurement passes, wherein the transmit signal is received by the transceivers. In one improvement, all signals transmitted during a measurement process are coherent with one another.

It is a matter of course that every receiver, if present, receives all or at least a part of the signals transmitted by the transceivers during the at least two measurement passes.

If the additional radio node also operates as a transceiver during the measurement process, this transceiver participates in the at least two measurement passes as an additional transceiver.

If the additional radio node operates as a transmitter, it is a matter of course that the additional transmission time period and the transmission time periods of the transceivers do not overlap, which is to say the radio nodes do not transmit simultaneously. The additional transmission time period is incorporated into one or several or all measurement passes, so that the additional transmission time period is after one of the transmission time periods and before another transmission time period. Alternatively, the transmission time period is before and/or after one or several or all measurement passes. Preferably, the transmitter transmits once during each measurement pass, wherein a carrier frequency of the transmit signal of the transmitter takes on a different value for each measurement pass. It is especially preferred that the carrier frequencies of the transmit signals of the transmitters are changed in the same way as the carrier frequencies of the transceivers.

The measurement pass preferably is repeated multiple times, wherein the carrier frequency is changed within a predefined frequency range at each repetition. For example, a so-called frequency sweep is performed.

The measurement process includes at least one alignment measurement step, wherein no radio node of the radio node set transmits a signal and at least one radio node of the radio node set receives an interference signal component during the alignment measurement step, and at least one result of the alignment measurement step is used in the comparison process.

In the alignment measurement step, only the interference signals from the interference signal sources that are present are acquired by at least one of the radio nodes of the radio node set. This information can additionally be compared with the results of the first and second passes. Alternatively or in addition, a signal received by the test radio node during an alignment measurement step is compared within the scope of the comparison step with a signal received by a reference radio node during an alignment measurement step, and the result of this comparison is used as a further basis for the plausibility test or the decision about the association.

The received signal can be compared with a reference signal in the evaluation process, and the interference signal component is determined on the basis of deviations from the reference signal. According to one improvement, the reference signal is an unmodulated sinusoidal signal with the carrier frequency of the corresponding transmitted signal.

It is a matter of course that the reference signal can be implemented to correspond to the transmitted signal, and corresponds to a sine function in the case of an unmodulated transmit signal. The comparison between the received signal and the reference signal can be carried out by subtraction, for example.

A number of interference sources and/or a position of at least one interference source and/or a type of at least one interference source can be determined for each interference signal component. The type of modulation of the received signal or interference signal component, for example, is designated as the type of the interference source.

The measurement process and the evaluation process can be carried out multiple times, and a motion profile of interference sources is determined on the basis of the multiple interference signal components.

The at least one test radio node can be connected to an inertial sensor, and, in the comparison step, a motion profile of the test radio node determined by means of the inertial sensor is compared with the motion profile determined on the basis of interference signal components.

Further, during each measurement pass, the second transmit signal and each subsequent transmitted signal are created from at least a part of one of the signals received during the same measurement pass.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
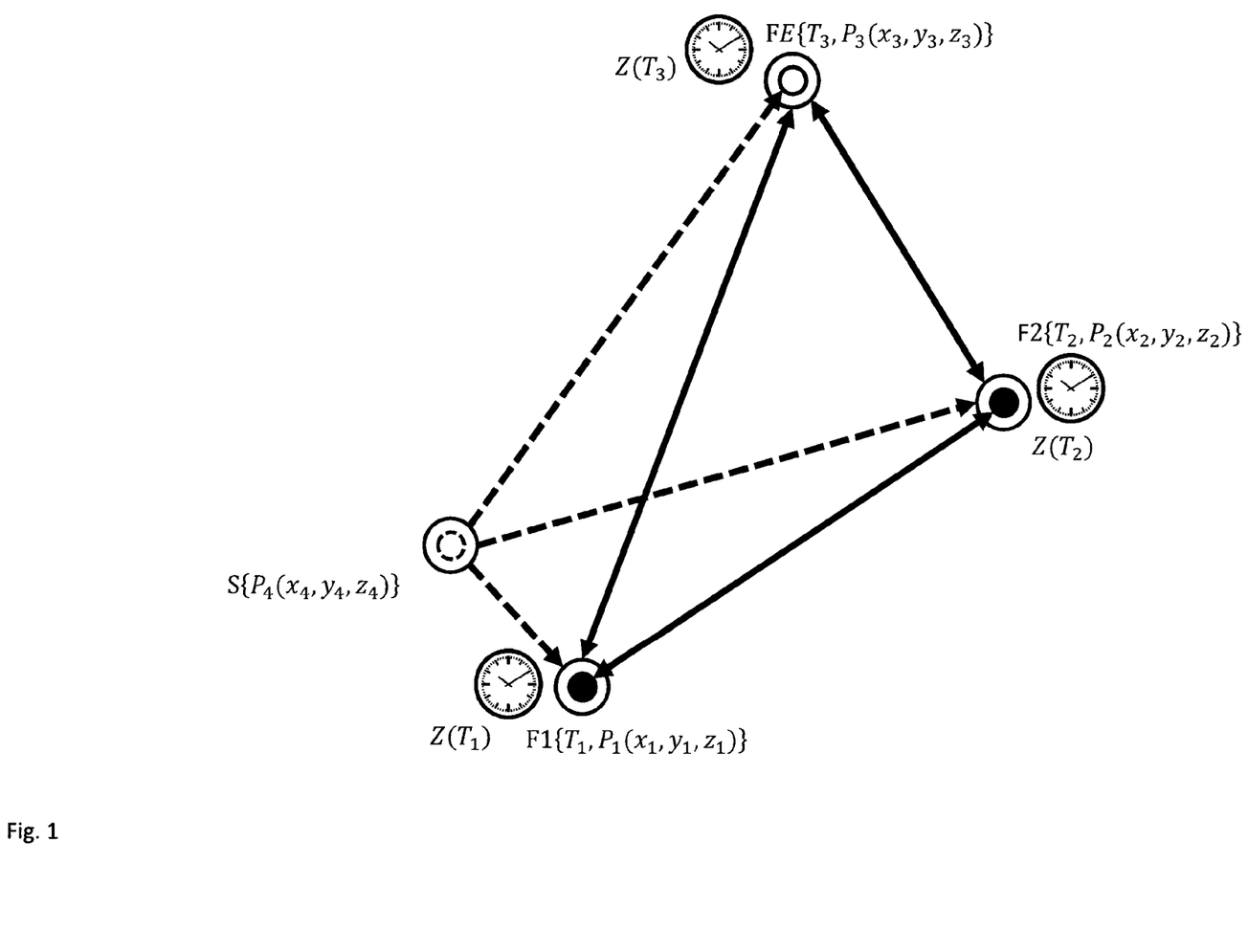
FIG. 1 shows a reference system and test radio nodes in an exemplary embodiment.

An exemplary embodiment according to the invention of a measurement process of the method for checking the association of radio nodes with a radio node environment on the basis of interference signal profiles is illustrated in FIG. 1. A minimal configuration, formed of a radio node set with three radio nodes F1, F2, and FE, is shown along with a radiated interference source S. The illustration was reduced to a two-dimensional representation for clarity. The two radio nodes F1 and F2 operate as transceivers.

During the measurement process, the additional, here the third, radio node FE operates in one of three modes, namely either exclusively as a receiver, exclusively as a transmitter, or likewise as a transceiver. It is the case for all radio nodes that transmit operation only takes place in assigned time domains, the transmission time periods, and the radio nodes of the radio node set never transmit simultaneously.

In contrast, the radiated interference source S transmits independently of the radio nodes of the radio node set, so that the signals from the radiated interference source S and the signals from the transmitting radio node are superposed at the receiving radio node, which is to say in the received signals.

Two of the three radio nodes F1, F2, and FE in this case are reference radio nodes that are spaced apart from one another and whose distance from one another is known. One of the three radio nodes F1, F2, and FE is a test radio node, whose distance and/or position is unknown and whose association is checked.

The reference radio nodes, with their distances that are known at least relative to one another, form a basis for introducing a reference coordinate system. It is a matter of course that the dimension of the reference coordinate system is determined by the number of reference radio nodes with different positions in space.

According to the stated assumptions, the units are reduced to points in space $P_i(x_i,y_i,z_i)$; these points are located in the center of the associated circles. The propagation paths are represented by lines that begin and end at the points associated with the units. Solid lines denote direct propagation paths between the radio nodes. Dashed lines denote the direct propagation paths between the radiated interference source S and the radio nodes. Lines with two arrowheads indicate that the propagation path is traversed in both directions. Lines with only one arrowhead indicate that the propagation path is traversed in only one direction.

In the exemplary embodiment shown, the additional, or here the third, radio node FE likewise operates as a transceiver during the measurement process; the lines running between the third radio node FE and the transceivers F1 and F2 correspondingly have two arrowheads.

An important property of the system shown is to separate useful signal, which is to say the signal components originating from the other radio nodes of the radio node set, from interference energy, which is to say the signal component originating from the interference source, to a certain degree and to characterize them in the process. This is possible because characteristics of the transmitted signals are known and can be used as reference signals in order to separate the useful portions of the measurement results.

It is a matter of course that in FIG. 1, only a single interference source S is shown purely symbolically for the radiated interference component that is to be analyzed. In principle, the interference components formed of radiation from additional systems located in the vicinity, wherein noise-like sources may also be included. Moreover, implementation-specific aspects can also lead to distortion of the measurement results. These interference quantities, as deviations from ideal system behavior, can be represented by suitable models, and thus the associated parameters can be extracted. If the useful signal component is adequate in relation to the noise or interference energy for suitable extraction, then channel transfer functions, time and frequency offset can also be determined in a further analysis of the useful signal component. However, this method of procedure is not part of the method according to the invention, which concentrates on the extraction of parameters of the received interference signals.

An environment is distinguished by a high degree of individuality on account of the extremely wide variety of objects present. These characteristics can therefore be used for feature extraction. These then form the basis for an authentication based on radio environment.

In the following, the effect of radiated interference on a radio system is explained using the example of an access system composed of a reference system with five reference radio nodes ANT1, ANT2, ANT3, ANT4, and ANT5 (framed radio nodes from FIG. 2), wherein electromagnetic radiation can be generated and also received through each reference radio node. The radio node set additionally includes a test radio node ANT6, the key, wherein the test radio node ANT6 can likewise generate and receive electromagnetic radiation.

Figure 2:
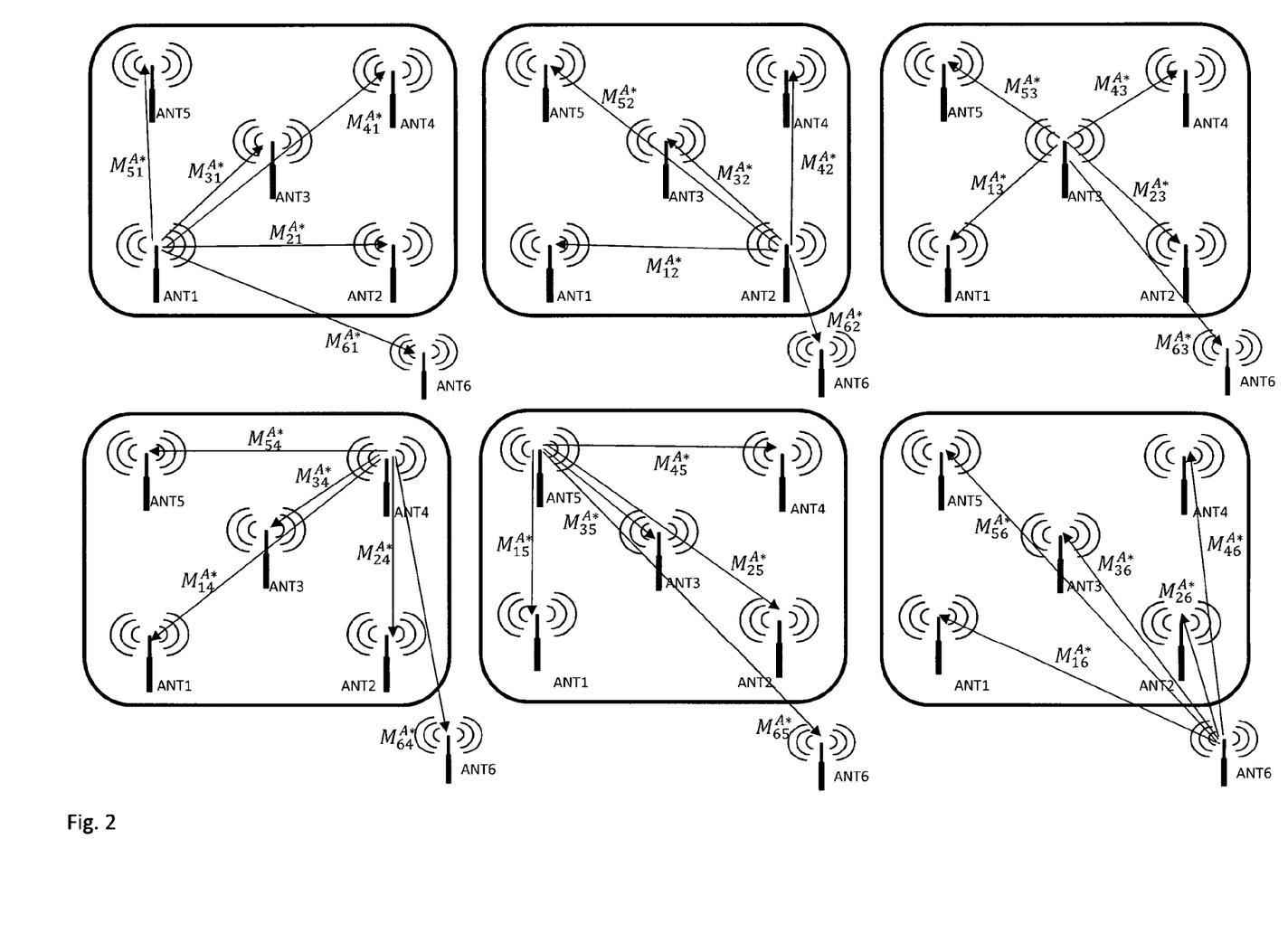
FIG. 2 shows a reference system and test radio nodes in an exemplary embodiment.

FIG. 2 illustrates a complete measurement pass of the system, as well.

The reference system will be considered first: During the measurement, each antenna of the reference system generates a signal that corresponds to the superposition of the radiation from all sources at its position. Based on the knowledge of the relevant signal generated by the system itself, which can be stored as the reference signal, characteristics of sources of electromagnetic radiation not belonging to the system, which are referred to here as interference sources (not shown), can be separated. The interference signal components can be summarized for the reference system in a matrix $Q^A(j\omega, t)$ with the elements $Q_{ij}^A(j\omega)$ wherein A designates the environment of the reference system.

$$Q^A(j\omega, t) = \begin{bmatrix} Q_{11}^A & Q_{12}^A & Q_{13}^A & Q_{14}^A & Q_{15}^A \\ Q_{21}^A & Q_{22}^A & Q_{23}^A & Q_{24}^A & Q_{25}^A \\ Q_{31}^A & Q_{32}^A & Q_{33}^A & Q_{34}^A & Q_{35}^A \\ Q_{41}^A & Q_{42}^A & Q_{43}^A & Q_{44}^A & Q_{45}^A \\ Q_{51}^A & Q_{52}^A & Q_{53}^A & Q_{54}^A & Q_{55}^A \end{bmatrix}$$

In contrast to the extraction of the channel transfer function $H_{ij}^A(j\omega)$ and of the time offset and frequency offset $T_{offs,ij}^A$, $f_{offs,ij}^A$, the focus of interest here is not the useful signal component (the portion of the received energy that is transmitted by the system itself), but instead the interference signal component or noise component of the measurement result. The portion of the interference energy, which is to say the interference signal component, in the measurement result can be extracted if the useful signal is basically known in terms of its characteristics and can be used as a reference signal, for example an unmodulated transmit signal with known carrier frequency. If applicable, a substitute reference signal can be generated through approximation of the received signal if not all characteristics of the useful signal are known.

The results of system operations such as channel occupancy measurements (CCA—clear channel assessment) can also be used to generate these elements. The elements $Q_{ij}^A(j\omega, t)$ that are marked in bold here can be interpreted differently as a function of system design. If the system has the capability to separate transmitted and received energy (high isolation characteristics are required), the result is an image of the transfer function of the relevant antenna to itself and a corresponding parameter for characterizing the energy from other sources. Consequently, a measured quantity that describes the characteristics or order of magnitude of the electromagnetic energy from interference sources at the place of the relevant antenna can be derived by the means that all antennas are switched to the receive mode according to a third measurement section. In this case, the system does not contribute to the distribution in the surroundings; it is exclusively the energy of other sources at the relevant point in time in the sampled frequency range that is determined.

The characteristics of the radiated interference energy are very specific for a particular radio environment, and moreover are characterized by their non-stationary behavior over time. Consequently, the applicable values $Q_{ij}^A(j\omega, t)$ correspond to the received radiated interference energy, which is to say the interference signal component, at the time of the relevant measurement, and can thus be utilized for authentication by means of feature extraction.

In the following, the interaction with the test radio node is considered: An access system, such as the reference system described, interacts in general with other components that are part of a larger overall system and thus should receive access to system resources. In the case of an access system, the solution is directed toward identifying other objects and allowing them access to access areas. Merely by their presence (changing the propagation characteristics through additional reflections) and their function (transmitting electromagnetic radiation), they change or expand the radio environment to a certain extent.

These changes are considered below. The access system shown in FIG. 2 in the presence of the test radio node ANTE represents such an expanded radio environment A*.

The entry of an additional node leads to changes in the propagation conditions. In the specific case of a key, the effect of the key should be understood in the larger sense, since the key influences the radio environment in conjunction with its bearer, a person.

In principle, a reference system in the simplest case can detect changes in the environment solely as a result of altered propagation behavior. Positioning and motion detection to the level of motion localization are also possible by passive means.

In the active case, all antennas (including the antennas of the additional test radio node) can in principle not only transmit signals but also receive electromagnetic energy, and the received signals can be analyzed with regard to useful signal behavior and interference signal behavior and also with regard to noise characteristics. The expansion of the system by additional test radio nodes results in an expansion of the matrix of the time-varying transmissions by other systems or interference sources $Q_{ij}^{A*}(j\omega) = f(I_{ij}^{A*}(j\omega), N_{ij}^{A*}(j\omega))$ to be extracted. Furthermore, the space of available node parameters also expands, as is evident from the example of the frequency offset and time offset $T_{offs,ij}^{A*}$ and $f_{offs,ij}^{A*}$.

By including the at least one test radio node ANTE in the measurement process, it is possible to expand the features of the radio environment A so that characteristic features of an expanded radio environment A* arise. The corresponding matrix $Q^{A*}$ likewise expands by one row and one column for each test radio node:

$$Q^{A*} = \begin{bmatrix} Q_{11}^{A*} & Q_{12}^{A*} & Q_{13}^{A*} & Q_{14}^{A*} & Q_{15}^{A*} & Q_{16}^{A*} \\ Q_{21}^{A*} & Q_{22}^{A*} & Q_{23}^{A*} & Q_{24}^{A*} & Q_{25}^{A*} & Q_{26}^{A*} \\ Q_{31}^{A*} & Q_{32}^{A*} & Q_{33}^{A*} & Q_{34}^{A*} & Q_{35}^{A*} & Q_{36}^{A*} \\ Q_{41}^{A*} & Q_{42}^{A*} & Q_{43}^{A*} & Q_{44}^{A*} & Q_{45}^{A*} & Q_{46}^{A*} \\ Q_{51}^{A*} & Q_{52}^{A*} & Q_{53}^{A*} & Q_{54}^{A*} & Q_{55}^{A*} & Q_{56}^{A*} \\ Q_{61}^{A*} & Q_{62}^{A*} & Q_{63}^{A*} & Q_{64}^{A*} & Q_{65}^{A*} & Q_{66}^{A*} \end{bmatrix}$$

The individual features have only limited validity on account of the time-varying behavior of the various systems. This non-stationary behavior must be taken into account in the integrity and plausibility test.

Figure 3:
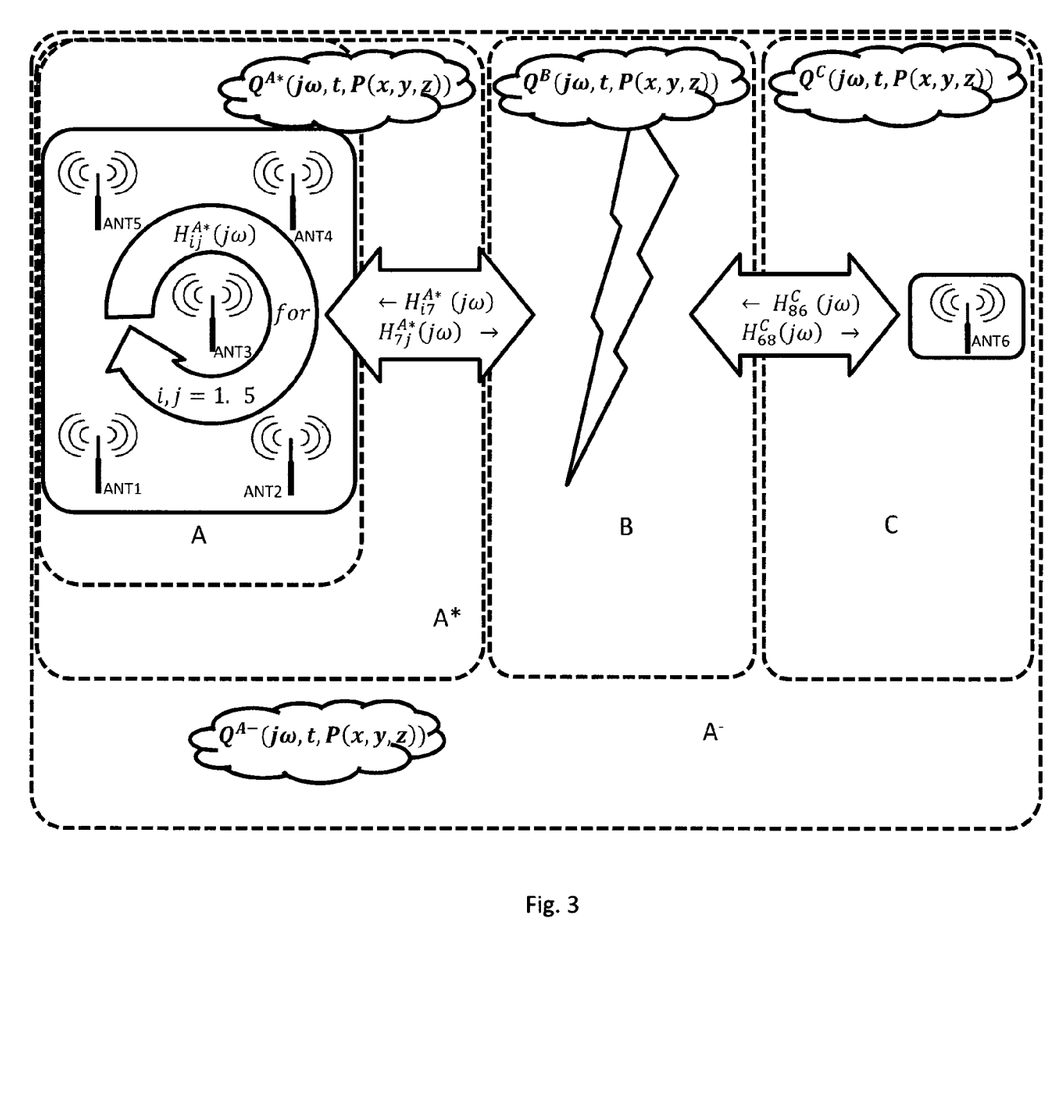
FIG. 3 shows linking of interference distributions in the case of a relay attack.

FIG. 3 additionally shows the effect of a relay attack system on an authentication requirement by means of the relay attack system. Here, the relay attack system is located in a radio environment B and the test radio node is located in a radio environment C.

In this section, the utilization of radiated interference that is present in a radio environment for detecting relay attacks is illustrated. To this end, the differences with regard to the interference profile of a regular authentication process ($Q^{A*}$) and a relay attack ($Q^{A-}$) are compared.

According to one embodiment, the reference system obtains an overview of the radiated interference situation in its surroundings through overview measurements (also referred to as channel occupancy tests and energy distribution tests over the bandwidth) in a standby mode in which no authentication query takes place. In this process, an image of the interference energy distribution $Q^A$ in the environment of a reference system is created as described above.

The entry of the test radio node into the radio environment A of the reference system causes an expansion of the detectable interference distribution. A transition A→A* or A→A− takes place.

The respective interference distributions can be described by the following matrices.

$$Q^{A*}(j\omega, t, P(i,j)) = \begin{bmatrix} Q_{11}^{A*} & Q_{12}^{A*} & Q_{13}^{A*} & Q_{14}^{A*} & Q_{15}^{A*} & Q_{16}^{A*} \\ Q_{21}^{A*} & Q_{22}^{A*} & Q_{23}^{A*} & Q_{24}^{A*} & Q_{25}^{A*} & Q_{26}^{A*} \\ Q_{31}^{A*} & Q_{32}^{A*} & Q_{33}^{A*} & Q_{34}^{A*} & Q_{35}^{A*} & Q_{36}^{A*} \\ Q_{41}^{A*} & Q_{42}^{A*} & Q_{43}^{A*} & Q_{44}^{A*} & Q_{45}^{A*} & Q_{46}^{A*} \\ Q_{51}^{A*} & Q_{52}^{A*} & Q_{53}^{A*} & Q_{54}^{A*} & Q_{55}^{A*} & Q_{56}^{A*} \\ Q_{61}^{A*} & Q_{62}^{A*} & Q_{63}^{A*} & Q_{64}^{A*} & Q_{65}^{A*} & Q_{66}^{A*} \end{bmatrix}$$

$$Q^{A-}(j\omega, t, P(i,j)) = \begin{bmatrix} Q_{11}^{A-} & Q_{12}^{A-} & Q_{13}^{A-} & Q_{14}^{A-} & Q_{15}^{A-} & Q_{16}^{A-} \\ Q_{21}^{A-} & Q_{22}^{A-} & Q_{23}^{A-} & Q_{24}^{A-} & Q_{25}^{A-} & Q_{26}^{A-} \\ Q_{31}^{A-} & Q_{32}^{A-} & Q_{33}^{A-} & Q_{34}^{A-} & Q_{35}^{A-} & Q_{36}^{A-} \\ Q_{41}^{A-} & Q_{42}^{A-} & Q_{43}^{A-} & Q_{44}^{A-} & Q_{45}^{A-} & Q_{46}^{A-} \\ Q_{51}^{A-} & Q_{52}^{A-} & Q_{53}^{A-} & Q_{54}^{A-} & Q_{55}^{A-} & Q_{56}^{A-} \\ Q_{61}^{A-} & Q_{62}^{A-} & Q_{63}^{A-} & Q_{64}^{A-} & Q_{65}^{A-} & Q_{66}^{A-} \end{bmatrix}$$

An examination of the characteristics of the individual elements for the derivation of different classes, which are dealt with in a differentiated manner, follows.

Class 1: $Q_{ij}^{A*,A-}$ for i, j=1 . . . 5: designates the detected radiated interference energy in the environment of the access system; these elements are closely connected to the elements of the matrix $Q^A$, and corresponding characteristics can be transferred via equivalence relationships, and thus tested for plausibility. These elements are determined during the evaluation process by means of the first pass.

Class 2: $Q_{6j}^{A*,A-}$ for j=1 . . . 5: designates the detected radiated interference energy that is detected by the test radio node, e.g., key/tag, while the individual antennas of the reference system radiate a reference signal. These elements are determined during the evaluation process by means of the second pass for a receiving test radio node.

Class 3: $Q_{i6}^{A*,A-}$ for i=1 . . . 5: designates the detected radiated interference energy that is detected by the individual antennas of the reference system while the test radio node, e.g., key/tag, radiates a reference signal. These elements are determined during the evaluation process by means of the second pass for a transmitting test radio node.

Class 4: $Q_{ii}^{A*,A-}$ for i=1 . . . 6: designates the detected radiated interference energy that is detected at an antenna of the radio node set when this antenna either operates simultaneously in transmitting mode and receiving mode, or operates only in receiving mode together with all other antennas of the radio node set. These elements are accordingly determined in an alignment measurement step, for example.

In the case of a relay attack, the measured quantities of Class 1 include the interference distribution in the environment of the reference system at the points in time when the corresponding antennas are operated in receiving mode. On account of their local spatial distribution, they form an adequate image of the local interference distribution and serve as the basis for a classification.

The measured quantities of Class 1 thus serve as a starting point or basis of comparison for an integrity and plausibility test with regard to the test radio node, for example a key. The radiated interference energy detected by the test radio node (Class 2) and/or the radiated interference energy detected by the reference system in conjunction with signals transmitted by the test radio node (Class 3) are employed for the comparison.

According to Class 4, the interference signal components are measured directly or only against a noise component. In this way, measurement quantities of Class 4 determined by a test node can be compared directly with measurement quantities of Class 4 measured by a reference radio node. The measurement quantities of Class 4 determined with one or more reference radio nodes also form an adequate image of the local interference distribution.

In this way, an estimation or classification of the radiated interference characteristics of an environment is possible that allows conclusions regarding radiated interference sources to be drawn with respect to:

Presence of radiated interference sources (simplest case),
Type of radiated interference sources, for example through determination of modulation parameters,
Number of radiated interference sources,
Location of radiated interference sources, for example through time difference measurements,
Motion of radiated interference sources (complex case).

This interference source classification results in high-quality features and thereby permits a check with greater protection.

In the case of a relay attack, the transmitted signals are exposed to the radiated electromagnetic interference distribution in the environment of the reference system $Q^A$ and also to the interference distributions around the relay system $Q^B$ and the radiated interference energy around the key system $Q^C$. This means that when the test node is receiving the signals from the reference system that are forwarded through the relay system, said test node is exposed to an interference distribution that in practice corresponds to a superposition of the interference sources in all three environments.

These effects are summarized in the following equation:

$$Q^{A-} = \begin{bmatrix} Q_{11}^{A*} & Q_{12}^{A*} & Q_{13}^{A*} & Q_{14}^{A*} & Q_{15}^{A*} & Q_{17}^{A*} \otimes Q_{78}^{B} \otimes Q_{86}^{C} \\ Q_{21}^{A*} & Q_{22}^{A*} & Q_{23}^{A*} & Q_{24}^{A*} & Q_{25}^{A*} & Q_{27}^{A*} \otimes Q_{78}^{B} \otimes Q_{86}^{C} \\ Q_{31}^{A*} & Q_{32}^{A*} & Q_{33}^{A*} & Q_{34}^{A*} & Q_{35}^{A*} & Q_{37}^{A*} \otimes Q_{78}^{B} \otimes Q_{86}^{C} \\ Q_{41}^{A*} & Q_{42}^{A*} & Q_{43}^{A*} & Q_{44}^{A*} & Q_{45}^{A*} & Q_{47}^{A*} \otimes Q_{78}^{B} \otimes Q_{86}^{C} \\ Q_{51}^{A*} & Q_{52}^{A*} & Q_{53}^{A*} & Q_{54}^{A*} & Q_{55}^{A*} & Q_{57}^{A*} \otimes Q_{78}^{B} \otimes Q_{86}^{C} \\ Q_{71}^{A*} \otimes Q_{87}^{B} \otimes Q_{68}^{C} & Q_{72}^{A*} \otimes Q_{87}^{B} \otimes Q_{68}^{C} & Q_{73}^{A*} \otimes Q_{87}^{B} \otimes Q_{68}^{C} & Q_{74}^{A*} \otimes Q_{87}^{B} \otimes Q_{68}^{C} & Q_{75}^{A*} \otimes Q_{87}^{B} \otimes Q_{68}^{C} & Q_{66}^{A*} \end{bmatrix}$$

The superposition of the individual interference distribution is expressed by the x operator.

Since the antenna ANT7 of the relay system (not shown) is located in the expanded environment of the reference system, the interference energy $Q_{7j}^{A-}$ detected here corresponds to the energy $Q_{6j}^{A*}$ for j=1 . . . 6, which a test radio node would also detect in the case of a qualified entry. Moreover, the energy detected at this point also stands in a plausible relationship with the interference distribution $Q^A$ detected by the access system.

The radiated interference of the relay environment $Q_{78}{}^B$ or $Q_{87}{}^B$ (depending on the point in time) and the radiated interference in the environment of the (remote) $Q_{68}{}^C$ or $Q_{86}{}^C$ are superposed on the way to and from the test radio node.

These additional radiated interferences can be identified with integrity and plausibility tests. Although radiated interference is not predictable, the ubiquitous presence of radio systems, especially in the 2.4 GHz band, has the result that these features have good significance with regard to the identification of relay attacks. For example, a relay attack that not only compensates for the direct and indirect propagation paths, but also carries out an identification and correction of interference signals and stays within time limits in doing so is considered unachievable.

Figure 4:
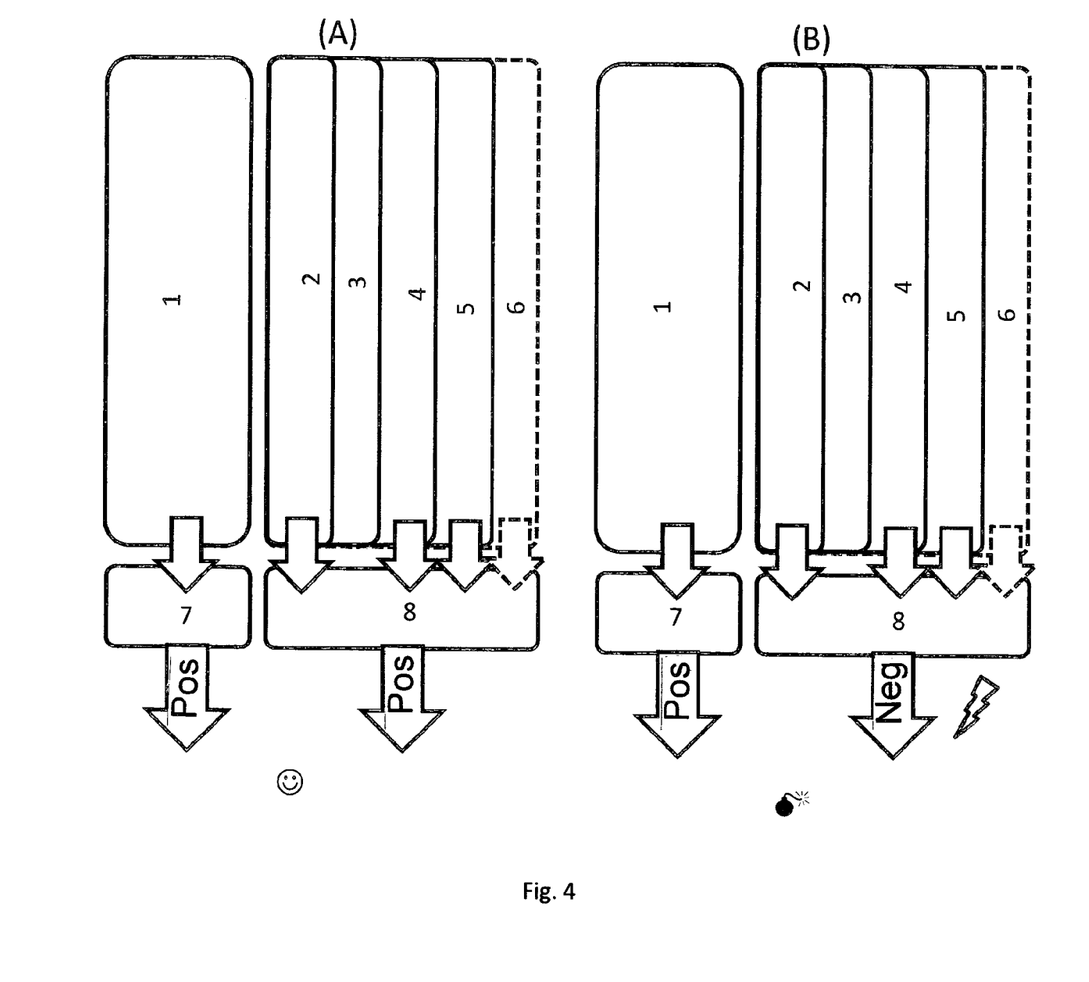
FIG. 4 shows a formation of an expanded radio environment ID in combination with classification and pattern recognition methods for defending against relay attacks.

FIG. 4 illustrates how an authentication can be implemented through a combination of the method according to the invention based on interference signal analysis with additional test methods, thus achieving an especially reliable detection of relay attacks.

On the left side (A), a positive decision is made on the authentication and access is granted, while on the right side (B), a relay attack is detected and access is denied.

In this process, the following steps are carried out in parallel: Authentication with cryptographic methods (signatures, MAC, . . . ) 1, narrowband transit time measurement 2, determination of the system transfer functions (channel transfer functions or channel impulse responses) 3, interference component determination 4, determination of time and frequency offset 5, motion profile determination through inertial sensors 6.

In a step 7, the authentication by means of cryptographic methods 1 is evaluated as an integrity test. A relay attack may not be detectable, so that (A) and (B) are decided positively (pass).

Steps 2 through 6 can all be carried out, but it is equally possible for only a part of these test methods to be carried out. Following a classification and pattern recognition of the results of steps 2 through 5, in a step 8 the relay attack is reliably detected and accordingly is decided negatively (fail), so that as a result an authentication of the relay attack fails.

Figure 5:
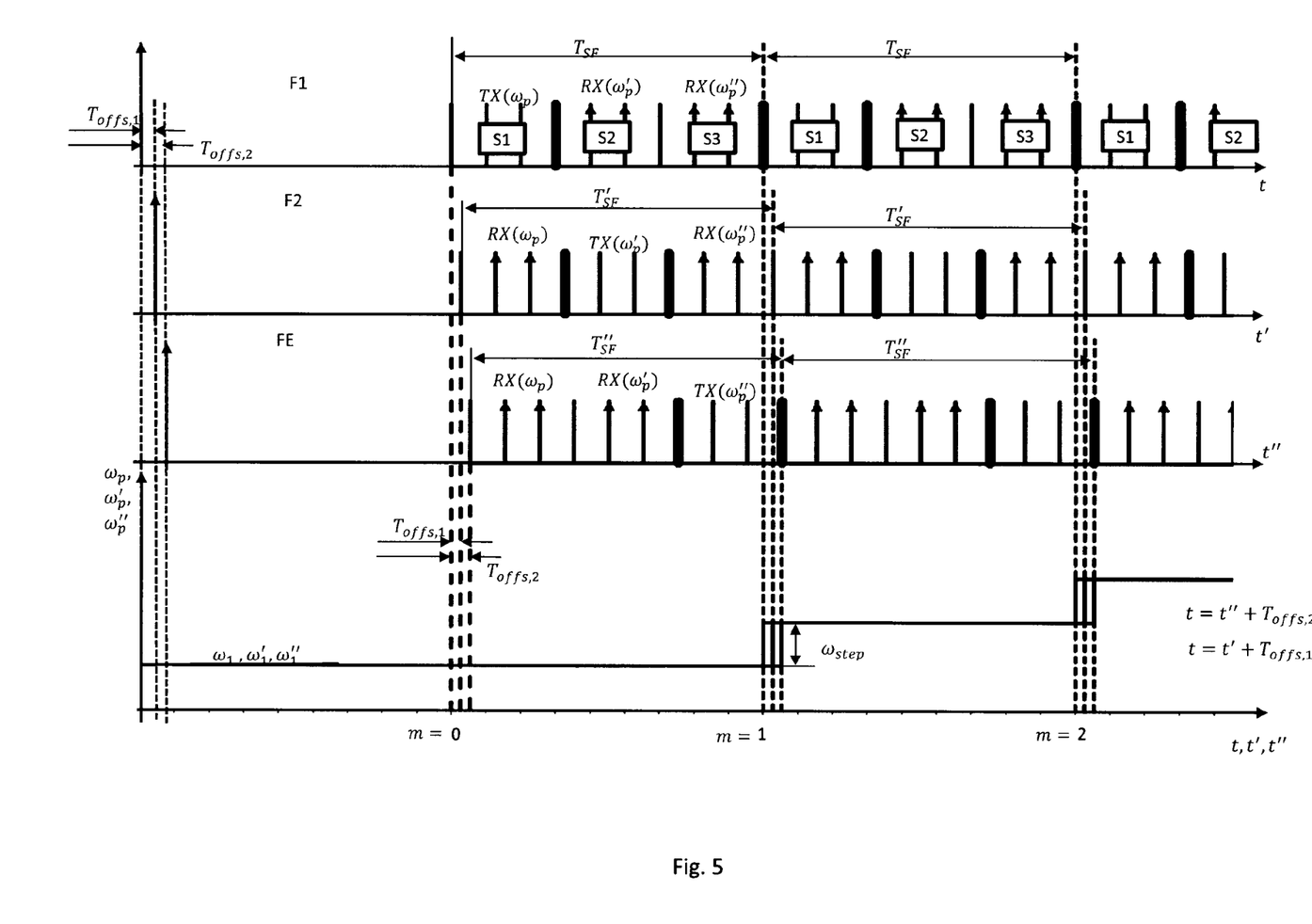
FIG. 5 shows a time sequence of measurement.

FIG. 5 shows a time sequence of a measurement process in a first embodiment. During the measurement process, all three radio nodes of the radio node set, which is to say the two reference radio nodes and the test radio node, operate as transceivers.

The top part of FIG. 5 shows the operation of the three radio nodes over multiple measurement passes, wherein each line corresponds to a radio node. Each of the arrows represents a sample and sample time of a received signal. Heavy bars denote a transition from receiving mode to transmitting mode and vice versa. The lines without arrowheads indicate the concurrent running of the relevant clock or the reception of the relevant time base even while a radio node is in transmitting mode.

The bottom part of FIG. 5 shows the progression of the carrier frequency $\omega_p$.

All radio nodes of the radio node set operate on their own time base T1, T2, or T3, defined by the relevant clock Z(T1), Z(T2), or Z(T3), respectively, each with its own time unit $T_{MU}$, $T'_{MU}$, or $T''_{MU}$, on the basis of which all actions take place. The time units $T_{MU}$, $T'_{MU}$, or $T''_{MU}$, or rather the step size defined in each case, is maintained continuously through one or more repetitions of the measurement pass.

The time axes T2 and T3 are shifted relative to the time axis T1 by the time offset $T_{offs,12}$ or $T_{offs,13}$, respectively.

The index m here designates the index of the repetition of the measurement pass, wherein in this case the frequency of the frequency generators, i.e., the relevant carrier frequency, is changed at the start of each measurement pass. The index m has a value range m=0, 1, . . . , ($m_{max}$−1). The value of $m_{max}$ is determined by the specific implementation and depends on factors including the number of frequencies that are to be determined for a system transfer function.

To distinguish the corresponding quantities of the individual radio nodes, all quantities are identified using different prime symbols (for example, for the frequencies: F1:$f_p$, F2:$f'_p$, FE:$f''_p$).

Each radio node in itself constitutes a discrete time system with T1=$n\cdot T_{MU}$+$m\cdot T_{SF}$, T2=$n\cdot T'_{MU}$+$m\cdot T'_{SF}$, or T3=$n\cdot T''_{MU}$+$m\cdot T''_{SF}$, where the index n designates the time steps of duration $T_{MU}$ within a measurement pass.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for checking an association of radio nodes with a radio environment, the method comprising:
   providing a radio node set of at least three radio nodes spaced apart from each other by evaluating interference signal components, wherein each radio node of the radio node set has a radio interface and its own clock, wherein a time offset exists between the clocks of the radio nodes in each case, wherein at least two radio nodes of the radio node set are reference radio nodes, a distance from each reference radio node to the other reference radio nodes is known, and the reference radio nodes constitute a reference system with a radio environment, wherein at least one radio node of the radio node set is a test radio node, and an association of the at least one test radio node with the radio environment of the reference system is checked;
   performing a measurement process, a subsequent evaluation process, and a comparison process;
   transmitting and receiving, during the measurement process, signals having a carrier frequency by radio nodes of the radio node set, at least two radio nodes of the radio node are set to operate as transceivers during the measurement process, and at least one radio node operates exclusively as a transmitter or exclusively as a receiver or as a transceiver during the measurement process;
   providing the evaluation process with an evaluation step;
   determining an interference signal component in the evaluation step on the basis of a signal transmitted by a first radio node of the radio node set and received by a second radio node of the radio node set;
   performing, during the evaluation process, a first evaluation step at least once in a first pass for at least one pair of reference radio nodes;
   performing, during the evaluation process, the first evaluation step at least once in a second pass for a test radio node and a reference radio node; and
   making, in the comparison process, a positive or negative decision on an association with a radio environment based on at least one result of the first pass and at least one result of the second pass.

2. The method according to claim 1, wherein, the measurement process includes at least two measurement passes, wherein in each measurement pass, a transmit signal with a carrier frequency is transmitted during a transmission time period by each transceiver in succession and the transmit signal that is transmitted is received by at least the other transceivers during a receiving time period, wherein the transmit signals of the transceivers are coherent with one another at least during one measurement pass, wherein the carrier frequency of each measurement pass differs from the carrier frequencies of all other measurement passes or is the same as at least one of the carrier frequencies of the other measurement passes, and wherein, if one radio node operates as a transmitter during the measurement process, the at least one transmitter in each case transmits a transmit signal with a carrier frequency during at least one additional transmission time period before or during or after one of the measurement passes, wherein the transmit signal is received by the transceivers.

3. The method according to claim 2, wherein all signals transmitted during a measurement process are coherent with one another.

4. The method according to claim 1, wherein the measurement process includes at least one alignment measurement step, no radio node of the radio node set transmits a signal and at least one radio node of the radio node set receives an interference signal component during the alignment measurement step, and at least one result of the alignment measurement step is used in the comparison process.

5. The method according to claim 1, wherein the received signal is compared with a reference signal in the evaluation step, and the interference signal component is determined on the basis of deviations from the reference signal.

6. The method according to claim 5, wherein the reference signal is an unmodulated sinusoidal signal with the carrier frequency of the corresponding transmitted signal.

7. The method according to claim 1, wherein a plurality of interference sources and/or a position of at least one interference source and/or a type of at least one interference source is determined for each interference signal component.

8. The method according to claim 1, wherein the measurement process and the evaluation process are carried out multiple times, and a motion profile of interference sources is determined on the basis of the multiple interference signal components.

9. The method according to claim 8, wherein the at least one test radio node is connected to an inertial sensor, and, in the comparison step, a motion profile of the test radio node determined by means of the inertial sensor is compared with the motion profile determined on the basis of the interference signal components.

10. The method according to claim 8, wherein, during each measurement pass, the signal transmitted as a second signal, and each subsequent transmitted signal, are created from at least a part of one of the signals received during a same measurement pass.

* * * * *